United States Patent [19]
Chua

[11] 3,955,194
[45] May 4, 1976

[54] MICROWAVE HYBRID NETWORK PRODUCING DESIRED PHASE DIFFERENCE FOR USE IN DOPPLER RADAR SYSTEMS

[75] Inventor: Lye-Whatt Chua, Salfords, near Redhill, England

[73] Assignee: U.S. Philips Corporation, New York, N.Y.

[22] Filed: Nov. 6, 1974

[21] Appl. No.: 521,261

[30] Foreign Application Priority Data
Nov. 8, 1973 United Kingdom................ 51875/73

[52] U.S. Cl.................................. 343/8; 325/446; 333/11; 333/31 R; 333/84 M
[51] Int. Cl.² ........................ G01S 9/44; H01P 5/12; H01P 5/22
[58] Field of Search ............. 333/6, 9, 10, 11, 31 R; 321/69 W, 69 NL; 325/445, 446; 343/8

[56] References Cited
UNITED STATES PATENTS

| | | |
|---|---|---|
| 3,310,748 | 3/1967 | Putnam................................ 325/446 |
| 3,582,759 | 6/1971 | Malloy................................ 333/11 X |
| 3,769,610 | 10/1973 | Savarin et al. ........................ 333/10 |
| 3,870,960 | 3/1975 | Hallford et al....................... 325/446 |

*Primary Examiner*—Paul L. Gensler
*Attorney, Agent, or Firm*—Frank R. Trifari; George B. Berka

[57] ABSTRACT

A microwave transmission-line circuit for a Doppler radar with direction sensing comprises a hybrid junction and four split-tee junctions of which two constitute power dividers and two constitute power combiners; the inputs of the two dividers are respectively connected to two ports of the hybrid junction, and the outputs of the dividers are connected to the combiners; the lengths of the interconnections of the split-tee junctions are such that two Doppler signals in phase quadrature can be respectively derived from the outputs of the combiners.

13 Claims, 1 Drawing Figure

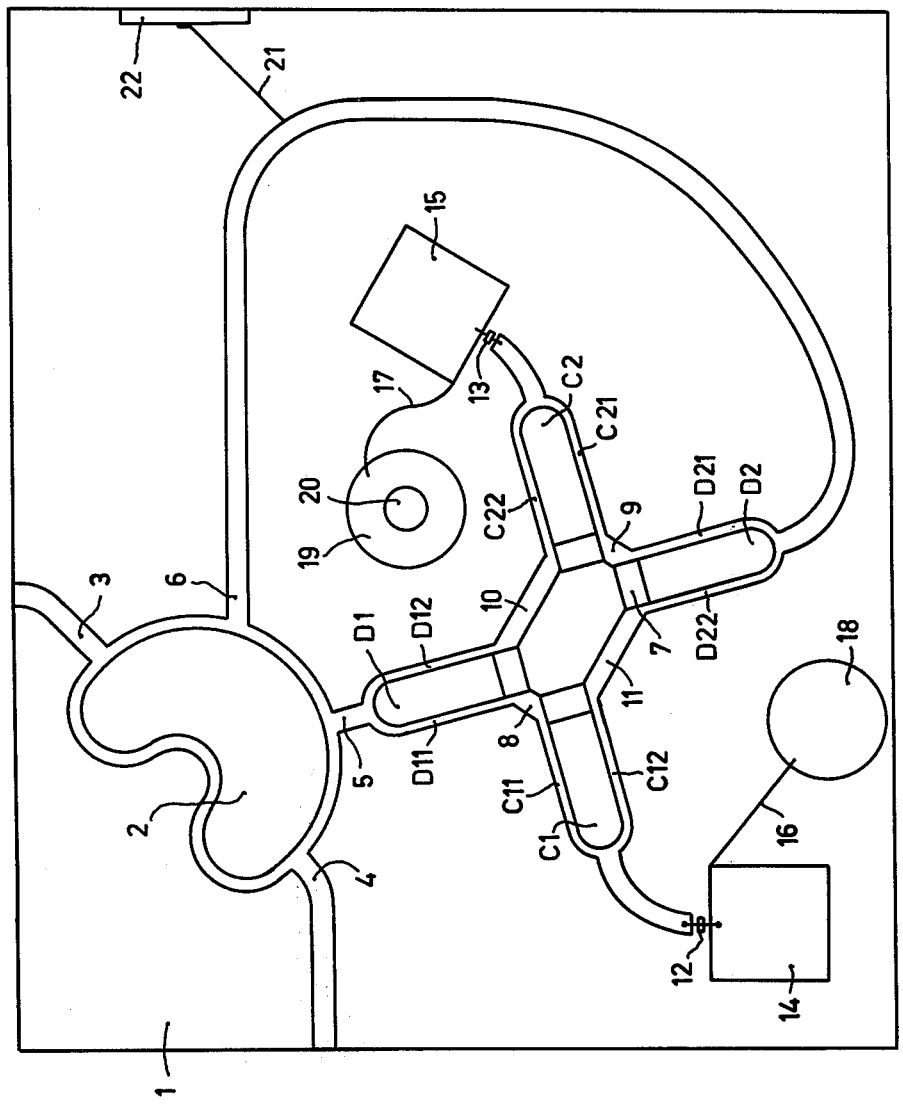

MICROWAVE HYBRID NETWORK PRODUCING DESIRED PHASE DIFFERENCE FOR USE IN DOPPLER RADAR SYSTEMS

This invention relates to a microwave transmission-line circuit of a kind suitable for use in, inter alia, a Doppler radar capable of distinguishing between opposite directions of motion of a target moving relative to the radar; the radar may of course also indicate the speed of the target. The invention further relates to a Doppler radar comprising said circuit.

In order for such a radar to be able to determine relative direction of motion, it must comprise at least two detectors, the arrangement preferably being such that when energy transmitted by the radar is received after reflection from a moving target, the phase difference between two Doppler signals appearing respectively at the outputs of the two detectors is substantially an odd multiple (such as unity) of 90°. The sense of the phase difference is dependent on the relative direction of motion of the target, and the radar can thus derive an indication of this direction.

It is an object of the invention to enable the construction of a moderately simple and cheap said circuit for applications in which relatively high sensitivity is not essential.

According to the invention, a microwave transmission-line circuit comprises a hybrid junction and four split-tee junctions, two of the split-tee junctions constituting power dividers and the other two constituting power combiners, wherein the inputs of the two dividers are respectively connected to two ports of the hybrid junction, wherein a first output of a first and of the second of the dividers are respectively connected to a first input of a first and of the second of the combiners, wherein the second outputs of the first and of the second dividers are respectively connected to the second inputs of the second and of the first combiners, and wherein the lengths of the interconnections of the split-tee junctions are such that the difference between the angles $x$ and $y$, as herein respectively defined, is substantially an odd multiple of 90°.

Angle $x$ is hereby defined as the difference in phase between two signals appearing respectively at the outputs of the first and second combiners when a signal is applied to the input of the first divider, and angle $y$ is similarly the difference in phase between two signals appearing respectively at the outputs of the first and second combiners when a signal is applied to the input of the second divider; $x$ and $y$ are measured in the same sense.

A split-tee junction comprises one conductor diverging into two branches which have a resistive interconnection to provide isolation between the branches. The one conductor forms the input and the ends of the two branches remote from the one conductor form the outputs when the junction is used as a power divider, and vice-versa when the junction is used as a power combiner.

A difference between the angles $x$ and $y$ of, for example, 90° may be obtained by arranging that the difference in phase between two signals appearing respectively at the outputs of the combiners when a signal is applied to the input of one of the dividers is substantially 45°; the same angular difference, but in the opposite sense, must then be arranged to occur when a signal is applied to the input of the other divider.

The hybrid junction is suitably a hybrid ring.

A Doppler radar may comprise the microwave circuit, an R.F. oscillator connected to a third port of the hybrid junction, and an aerial connected to the fourth port of the hybrid junction; it may further comprise means for deriving a signal representative of the sense of the rate of change of distance between a detected target and the radar.

An embodiment of the invention will now be described, by way of example, with reference to the accompanying diagrammatic drawing, being a plan view of a microwave integrated circuit which embodies the invention and is adapted for use in a Doppler radar.

The circuit is formed in microstrip on a single alumina substrate 1, and comprises a four-port hybrid ring 2. The ports are spaced around the ring with three intervals each of a quarter-wavelength and one interval of three-quarters of a wavelength. Two ports, 3 and 4, of the ring are for respective connection to a microwave oscillator and to an aerial (or vice-versa, since the circuit is effectively symmetrical). The remaining ports 5 and 6 are connected respectively to two matched split-tee junctions D1 and D2 each acting as a power divider. Each junction comprises a single input conductor diverging into two branches which are each substantially a quarter-wavelength long and are interconnected by a resistive film, such as 7 on junction D2, at their ends remote from the input conductor. The resistance is to provide isolation between the two output branches.

The circuit comprises two further split-tee junctions, C1 and C2, which are similar to junctions D1 and D2 but in this case act as power combiners. A first branch D11 of divider D1 is connected to a first branch C11 of combiner C1 by a short length of line 8, and a first branch D21 of divider D2 is connected to a first branch C21 of combiner C2 by a line 9 of the same length as line 8. The second branch D12 of divider D1 is connected to the second branch C22 of combiner C2 by a line 10 which is longer than lines 8 and 9, and the second branch C12 of combiner C1 by a line 11 of the same length as line 10. The difference in length between lines 8 and 9 and lines 10 and 11 is one-eighth of a wavelength.

One terminal of each of two mixer diodes 12 and 13 are respectively connected to the outputs of combiners C1 and C2; the other terminals of the diodes are connected to respective rectangular capacitors 14 and 15 each in the form of a quarter-wavelength open-circuited stub. The edge of each rectangle adjacent its respective combiner is connected by a respective wire 16, 17 to a respective circular capacitor, 18, 19. Each wire forms a high impedance transmission line and is substantially a quarter-wavelength long. In each case, the two capacitors interconnected by the high impedance line form a low-pass filter arrangement.

Low-frequency outputs can be taken from the circular areas 18 and 19, in the former case by a lead extending across the adjacent edge of the substrate and in the latter case by a lead passing through a hole 20 at the centre of circle 19.

The R.F. portion of the circuit is connected by a wire 21 substantially a quarter of a wavelength long to a strip-like conductive area 22 situated at the edge of the substrate and connected to the ground plane on the opposite side of the substrate. The wire forms a high-impedance transmission line providing a D.C. and low-frequency earth return for the diodes, with low R.F.

loss from the circuit. D.C. bias currents for the diodes can be supplied through the output leads connected to capacitors 18 and 19.

When the circuit is used in a Doppler radar with direction sense, an oscillator may be connected to port 3 of the hybrid ring 2 and an aerial to port 4. It is usually desirable for the oscillator to have good frequency stability; it may for example comprise a Gunn diode connected to a first port of a three-port circulator, a second port of which is connected to hybrid ring 2 and the third port of which is connected to a matched load. Energy flowing into port 3 of the hybrid ring is divided equally between ports 4 and 6, and hence between the aerial and power divider D2. Energy received by the aerial, for example by reflection from a moving target, and flowing into port 4 is divided equally between ports 3 and 5; in the former case, the energy is lost, and from the latter port, energy flows into power divider D1. Thus each of the mixer diodes 12 and 13 is supplied with local-oscillator energy through one branch of its associated power combiner and with received energy through the other branch of its combiner. The matching and the isolation between branches of each of the split-tee junctions assist the frequency stability of the oscillator.

Owing to the difference in length of one-eighth of a wavelength between lines 10 and 8, the phase of a received signal at diode 12 will be 45° behind that of the local-oscillator signal at diode 13. The net difference of 90° results in the same difference in phase between Doppler signals which are present in the outputs of the diodes when the radar receives energy reflected from a moving target.

The net difference of 90°, or any other odd multiple thereof, could of course be obtained by other arrangements: for example, lines 8 and 10 could be of the same length and lines 9 and 11 could differ in length by a quarter of a wavelength.

As mentioned above, the low-frequency Doppler output signals may be taken from capacitors 18 and 19, i.e. the outputs of the low-pass filter arrangements. A signal representative of the sense of the rate of change of distance between the detected target and the radar may be derived from the relative phases of the Doppler signals, for example as described in the British Pat. No. 1,357,457, and a signal representing the speed of the target may of course be derived from the frequency of the Doppler signals.

An embodiment of the form shown in the Figure has been constructed on a substrate approximately 20 mm square, the basic characteristic impedance of the circuit being 50 ohms. The circuit was found to operate satisfactorily at its mid-band radio frequency of about 9.4 GHz; it was also found that the R.F. bandwith was approximately 20%. A single circuit might therefore be operated at any appropriate frequency within a fairly useful range.

The hybrid junction in the circuit need not be a hybrid ring; it may for example be a 3 dB directional coupler.

Uses for the circuit are not restricted to Doppler radars; it may alternatively for example be used as the discriminator in a phase-locked-loop for frequency stabilisation of a microwave oscillator, or in a single-sideband modulator or demodulator.

A Doppler radar comprising the circuit may for example be used in a burglar alarm, an aid for a blind person, a traffic-lights control system, or an automatic cargo handling system.

What is claimed is:

1. A microwave transmission-line circuit comprising a hybrid junction and four split-tee junctions, two of the split-tee junctions constituting power dividers and the other two constituting power combiners, wherein the inputs of the two dividers are respectively connected to two ports of the hybrid junction, wherein first outputs of the first and of the second of the dividers are respectively connected to first inputs of the first and of the second of the combiners, wherein the second outputs of the first and of the second dividers are respectively connected to the second inputs of the second and of the first combiners, and wherein the differences in lengths of the interconnections of the split-tee junctions are such that the net difference between, a phase angle $x$ defined by the difference in phase between two signals appearing respectively at the outputs of the combiners when an input signal is applied to the first divider, and a phase angle $y$ defined by the phase difference between two output signals of the combiners when an input signal is applied to the second divider, is substantially an odd multiple of 90°.

2. A microwave circuit as claimed in claim 1 wherein the difference in phase between two signals appearing respectively at the outputs of the combiners when a signal is applied to the input of one of the dividers is substantially 45°.

3. A microwave circuit as claimed in claim 1 wherein the net difference between the angles $x$ and $y$ is substantially 90°.

4. A microwave circuit as claimed in claim 1 wherein the hybrid junction is a hybrid ring.

5. A microwave circuit as claimed in claim 1 wherein a D.C. path between live and earth conductors of the circuit is provided by a short-circuited quarter-wavelength high impedance transmission line.

6. A microwave circuit as claimed in claim 1 wherein the circuit is formed as microstrip on a single substrate.

7. A microwave circuit as claimed in claim 1 comprising a pair of first capacitors for respective connection through mixer diodes at the outputs of the two combiners.

8. A microwave circuit as claimed in claim 7 wherein each capacitor is in the form of a quarter-wavelength open-circuited transmission line.

9. A microwave circuit as claimed in claim 7 wherein each of the first pair of capacitors is connected to its respective combiner output by a respective mixer diode.

10. A microwave circuit as claimed in claim 7 comprising a pair of second capacitors for respective connection to the first pair.

11. A microwave circuit as claimed in claim 10 wherein the second capacitors are respectively connected to the first capacitors by respective high impedance transmission.

12. A microwave circuit as claimed in claim 11 wherein each high impedance transmission line is substantially a quarter-wavelength long.

13. A Doppler radar comprising a microwave transmission line circuit including a hybrid junction and four split-tee junctions, two of the split-tee junctions constituting power dividers and the other two constituting power combiners, wherein the inputs of the two dividers are respectively connected to two ports of the hybrid junction, wherein a first output of a first and of the second of the dividers are respectively connected to a first input of a first and of the second of the combiners, wherein the second outputs of the first and of the second dividers are respectively connected to the second inputs of the second and of the first combiners, and wherein the lengths of the interconnections of the split-tee junctions are such that the net difference between a phase angle $x$ defined by the difference in phase between two signals appearing respectively at the outputs of the combiners when an input signal is applied to the first divider, and a phase angle $y$ defined by the phase difference between two output signals of the combiners when an input signal is applied to the second divider, is substantially an odd multiple of 90°, and further comprising an R.F. oscillator connected to a third port of the hybrid junction, and an aerial connected to the fourth port of the hybrid junction.

* * * * *